United States Patent Office 3,436,310
Patented Apr. 1, 1969

3,436,310
HYDROLYSIS OF THE ACETOXYMETHYL GROUP AT THE 3-POSITION OF THE CEPHALOSPORIN NUCLEUS
Benjamin Harry Arnold, Slough, and Norman Haddow, Iver Heath, England, assignors to Glaxo Laboratories Limited, Greenford, England, a British company
No Drawing. Filed Oct. 23, 1965, Ser. No. 504,200
Claims priority, application Great Britain, Oct. 30, 1964, 44,429; Oct. 19, 1965, 3,614
Int. Cl. C12d *9/00;* C07d *93/02*
U.S. Cl. 195—36                        18 Claims

ABSTRACT OF THE DISCLOSURE

A compound of the formula

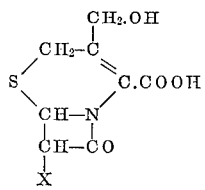

in which X represents an acylamino or an amino group is made by enzymatic hydrolysis of a compound of the formula

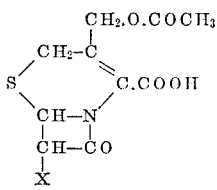

in which X is as defined above using an esterase derived from a species of the genus Rhizobium, the hydrolysis being carried out in aqueous medium at a pH between 5 and 8 and at a temperature between 20 and 45° C.

---

This invention is concerned with improvements in or relating to the production of degradation products of cephalosporin C and derivatives thereof.

Cephalosporin C is an antibiotic having the structure:

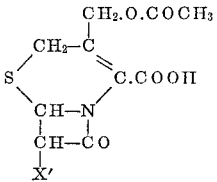

where X' is an α-aminoadipolyamino group. Derivatives of cephalosporin C in which the side chain X' is an acylamino group other than an α-aminoadipolyamino group, e.g., a phenylacetamid group or a thienylacetamido group or in which the amido nitrogen atom is further substituted, can also be prepared via 7-aminocephalosporanic acid (7-ACA), and the expression "derivatives of cephalosporin C" is used herein to denote derivatives of these types as well as 7-ACA itself. Examples of other variants of the side chain X' are described inter alia in Belgian patent specifications Nos. 635,137, 641,338, 645,868, 645,869 and 650,445.

Cephalosporin C is a derivative of the bicyclic compound cepham, which has the structure

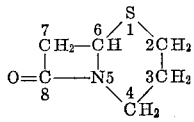

(see J.A.C.S., 84 (1962), page 3400) and is numbered as indicated. The systematic names used in this specification for the cephalosporin derivatives are based on this molecular structure.

Cephalosporin C and its derivatives can be subjected to enzymatic hydrolysis using an esterase derived from orange peel (British patent specification No. 966,222) to yield products wherein the acetoxy group is replaced by a hydroxy group, and from such products analogues of cephalosporin C and its derivatives can be prepared having instead of an acetoxy group, for example, other acyloxy groups or alkoxy groups. Such analogues are of interest in that several of them possess modified activity as compared with cephalosporin C.

The enzymatic hydrolysis of cephalosporin C and its derivatives by means of the citrus esterase is inconvenient, particularly when working on the large scale, a very large number of oranges being required to provide sufficient enzyme to hydrolyse even small quantities.

We have found that esterases derived from species of the genus Rhizobium are capable of hydrolysing cephalosporin C and its derivatives to the corresponding hydroxymethyl compounds. The use of a microorganism as a source of enzyme is particularly convenient as in general the organism can be readily cultured on the large scale by techniques well established in the fermentation industry. The enzymatic hydrolysis can, for example, be simply effected by incubating the organism with the cephalosporin C or derivative thereof or, more preferably, the organism can be cultured and esterase-containing material prepared therefrom which can be used for a subsequent hydrolysis step.

According to the invention therefore, we provide a process for the preparation of compounds of the formula

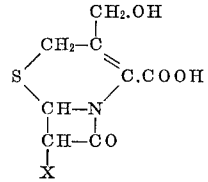

in which X represents an acylamino or an amino ($NH_2$) group by hydrolysis of compounds of the formula

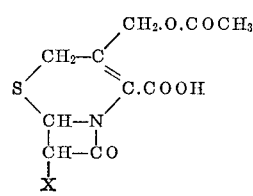

(in which X is as defined above), by means of an esterase, characterised in that one uses, as esterase, an esterase, derived from a species of the genus Rhizobium.

Bacteria of the genus Rhizobium are well known as the nitrogen fixation bacteria found in the root nodules of various leguminous plants, e.g. clover (Trifolium), lupin (Lupinus) and sweet pea (*Lathyrus odoratus*). Species of the genus Rhizobium which have been found to produce an esterase of the desired type include *Rhizobium trifolii, Rhizobium lupinii, Rhizobium japonicum, Rhizobium leguminosarium* and *Rhizobium phaseoli.*

In general the desired Rhizobium esterase appears to be best derived from a wild culture of an organism of the genus Rhizobium (i.e., a strain isolated directly from a plant), and in some instances we have found that unsatisfactory results may be obtained using an organism derived from a culture collection, possibly due to mutation of the organism under the conditions under which it is kept in the collection. Isolation of the organism from natural sources may be carried out by the methods described by Buchanan et al. in "Bacteriology," 5th Ed., The Macmillan Co., New York, 1951.

Best results have so far been obtained by the use of Rhizobium trifolii isolated as wild-type strains from *Trifolium dubium*. Such strains conform to the description of *Rhizobium trifolii* given by Bergey in "Manual of Determinative Bacteriology," 7th edition, Baliere, Tindall and Cox, London, 1957, p. 295; we have however noted that in addition to the characteristics given by Bergey, strains of *R. trifolii* found to be particularly useful produce a water-soluble red pigment on mannitol agar.

As stated above the hydrolysis of compounds of the formul I hereinbefore defined in accordance with the invention can be conducted simply by incubating the Rhizobium organism with the substance to be hydrolysed or alternatively firstly culturing the organism and then preparing an enzyme-rich material therefrom which is used in a separate hydrolysis step. The second of these procedures is preferred.

Organisms of the genus Rhizobium can be grown on conventional media either in surface or submerged aerobic culture, the latter being preferred. Suitable media are for example described by Levine et al. in "A Compilation of Culture Media for the Cultivation of Micro-Organisms," The Williams and Wilkins Co., Baltimore, 1930, indexed under "nitrogen fixation." A medium based on meat extract and peptone has been found to be very satisfactory. An alternative medium which can be used is one based on yeast extract, mannitol and conventional nutrient salts. In general the nitrogen content of the medium is preferably between 0.1 and 0.3% N, e.g., 0.2% N. Carbohydrate may be added as necessary.

For carrying out the hydrolysis of the compound of the Formula I in a culture medium the compound is simply included in the medium and the organism cultured in the usual way.

In order to prepare an enzyme-containing material from a culture of a species of the genus Rhizobium the culture is carried out to give an abundant growth, a culture time of about 24 hours being in general satisfactory. The cells may then be harvested, for example by centrifugation followed by washing. The isolated cells are then subjected to treatment with a water-miscible organic solvent for the removal of water and fat, suitable solvents being water miscible ketones, e.g., acetone, and water-miscible alcohols e.g., ethanol. Such treatment may for example be effected by resuspending the isolated cells in water and pouring the resulting suspension into a large excess of the water-miscible solvent, followed by stirring. The resultant solid may be washed with fresh solvent and is then ready for use.

The hydrolysis according to the invention of a compound of the formula I hereinbefore defined using an enzyme-containing solid as above described from Rhizobium may be effected in aqueous media preferably at a pH between 5 and 8; when 7-ACA is the substrate, the pH is preferably maintained at around 6.45. The enzyme-containing solid from Rhizobium may be suspended in the water and incubated for a short time to hydrate the cells. The compound of the formula I is then added conveniently as a salt, e.g., the sodium salt. The pH is then rapidly adjusted to the desired value. The hydrolysis is then effected by maintaining the mixture at a suitable temperature, preferably between 20° and 45° C., until hydrolysis is complete. Completion of the hydrolysis can be determined by titration of a portion of the reaction mixture from time to time with alkali.

The pH may be adjusted as the hydrolysis proceeds to maintain it within the desired limits by addition of alkali to neutralise the acetic acid produced. When the theoretical quantity of alkali has been used in this procedure corresponding to the acetate content of the compound to be hydrolysed, the reaction may be adjudged complete. Completion may also be checked by chromatographic assay.

The hydrolysis products can be recovered by conventional methods, the actual method used depending upon the nature of the product. As a preliminary step, the hydrolysis liquor is preferably first treated to remove protein therefrom, e.g. by addition of a protein precipitant such as a water-miscible solvent, e.g., acetone or methanol, followed by separation of the precipitated protein, e.g., by centrifugation and/or filtration.

With solvent-soluble hydroxymethyl derivatives of cephalosporin C, e.g., 7-phenylacetamido-3-hydroxymethyl-ceph-3-em-4-oic acid and 7-(thienyl-2'-acetamido)-3-hydroxymethyl-ceph-3-em-4-oic acid, the culture from the hydrolysis (either using live organisms or enzyme-containing solid) can be subjected at acid pH to extraction with a water-immiscible solvent for the desired product. The extraction is preferably carried out at a pH of from 3–4. Suitable solvents include for example ester solvents, e.g., ethyl acetate or butyl acetate, and water-immiscible ketones, e.g., methyl isobutyl ketone. The solvent extracts so obtained can be re-extracted with water conveniently at a pH of from 6–8, e.g. about 7.5, and the desired product recovered, e.g., by lyophilisation, or the solvent extracts may be evaporated to dryness. The resulting product may be recrystallised as desired.

In the case of products which are not solvent-soluble, e.g., 7-(D-5'-amino-5' - carboxypentanamido)-3-hydroxymethyl-ceph-3-em-4-oic acid and 3-hydroxymethyl-7-amino-ceph-3-em-4-oic acid, the reaction mixture may be first treated to remove protein and other high molecular weight material as described above. The desired product can then be recovered by adsorption on a suitable anion-exchange resin from buffered solution, followed by elution. The resulting extracts can be worked up to recover the desired substance e.g. lyophilised and further treated as desired.

However, 3-hydroxymethyl - 7 - amino-ceph-3-em-4-oic acid (the reaction product of 7-ACA) is more conveniently recoverd by adjustment of the pH of the reaction medium to the isoelectric point of the product, i.e., circa pH 4.5, to cause the product to precipitate. The precipitate may then be filtered or centrifuged off and washed.

For the better understanding of the invention the following examples are given only as illustrations:

PRELIMINARY

Preparation of rhizobium acetylesterase-containing solids (a) Shake flask culture: *Rhizobium trifolii* isolated from *Trifolium dubium* by culturing surface sterilised root nodule sections on nutrient agar medium, was maintained on nutrient agar slopes. Cells from one slope were suspended in sterile water (10 ml.) and used to inoculate 10× 40 ml. flasks of nutrient broth as described under (b) below. Flasks were incubated on a rotary shaker for two days at 26°. The cells were harvested by centrifugation at 5°, washed once with Ringer's solution and recentrifuged to give a thick cell paste.

The cell paste from 200 of such flasks was dispersed in water (50 ml.) and poured into vigorously acetone (1 l.); stirring was continued at room temperature for 30 min. when the dry cell mass was recovered by filtration. After washing with fresh acetone and ether, the filter cake was air-dried; yield=8.0 g.

(b) Culture in laboratory fermentors: The same strain of Rhizobium was also grown in 5 l. fermentors as follows:

"Lab. Lemco" meat extract (120 g.), "Oxoid" peptone (120 g.) and sodium chloride (60 g.) were dissolved in tap water (12 l.) and stirred for 30 min. The pH was adjusted to 7.2 with 10 N sodium hydroxide (12.5 ml.). 3×3 l. amounts were filled out into 5 l. stirred fermentors, together with 3 ml. 30% (v./v.) "Foamrex" (Mobile Oil Co.) in white mineral oil to act as antifoam. Fermentors were sterilised at 15 p.s.i. for 30 min. Each fermentor was inoculated with 20 ml. from a 24-hour oil nutrient broth culture of the organism and incubated at 26°. The fermentor was aerated at 6 l.p.m. and stirred at 600 r.p.m. The fermentation was stopped at 46 hours when the pH had risen to 8.90. Cells were harvested by centrifugation at 5°, washed once with Ringer's solution and resuspended in water (50 ml.). The suspension was poured into acetone (1 l.) and stirred at room temperature for 30 min. The precipitate was filtered, washed with fresh acetone and either and air-dried to yield an enzyme-containing powder. Yield=11.6 g.

(c) An alternative nutrient broth for the culture of Rhizobium species is as follows:

| | G. |
|---|---|
| "Difco" yeast extract | 50 |
| Mannitol | 50 |
| $K_2HPO_4$ | 1 |
| $MgSO_4$ | 1 |
| NaCl | 1 |
| $CaCl_2 \cdot 6H_2O$ | 1 |
| $FeCl_3$ | Trace |
| Water to 5 l. | |

Adjust to pH to 7.1 with NaOH

The thienyl radical mentioned in the examples is the 2'-thienyl radical.

EXAMPLE 1

(a) Action of Rhizobium acetylesterase on 7-phenylacetamido cephalosporanic acid: Rhizobium acetone powder (5 g.) prepared as described in Preliminary was suspended in water (200 ml.) and incubated at 30° for 30 min. 7-phenylacetamido-cephalosporanic acid ("7-PACA") sodium salt (1 g.) was then added, the whole rapidly adjusted to pH 7.0 with 10% (v.v.) phosphoric acid and a sample (0.1 ml.) removed for bioassay. The mixture was then incubated at 30° and titrated at intervals to pH 7.0 with N sodium hydroxide. 0.1 ml. samples for bioassay were removed at like intervals. The reaction showed the following assay pattern:

| Time (hr.) | Vol. N.NaOH added (ml.) | Titre of 7-PACA ($\gamma$/ml. at 1/2000 dilution) |
|---|---|---|
| 0.0 | 0.00 | 2.1 |
| 0.5 | 0.90 | 1.05 |
| 1.0 | 1.62 | 0.79 |
| 1.5 | 2.05 | 0.575 |
| 2.0 | 2.10 | |

Theor.=2.22.

The reaction was then stopped by pouring the whole into stirred acetone (400 ml.) After 10 minutes, the precipitate was removed by filtration. Acetone was removed from the filtrate by evaporation under vacuum and the residue diluted to 200 ml. with water. After filtration through a Seitz filter, the clear brown liquid was biologically assayed.

(b) Extraction of 7 - phenylacetamido - 3 - hydroxymethyl - ceph - 3 - em - 4 - oic acid: The above solution was adjusted to pH 3.3 with 10% (v./v.) phosphoric acid and immediately extracted with ethyl acetate (3× 200 ml.). The spent aqueous layer was sampled (0.1 ml.) for bioassay after each extraction, with the following results.

| Extract No.: | Titre of 7-PACA ($\gamma$/ml. at 1/100 dilution) |
|---|---|
| 0 | 10.8 |
| 1 | 6.0 |
| 2 | 3.25 |
| 3 | 1.44 |

Thus some 87% of the biological activity was extracted into the solvent.

The combined ethyl acetate layers were then extracted with water (100 ml.; 2× 50 ml.) which had been adjusted to pH 7.5 with saturated bicarbonate solution. The combined bicarbonate extract was adjusted to pH 5.5 by stirring with "Amberlite" IRC–50 resin (Rohm & Hass Co.) in the hydrogen cycle for 30 min. The resin was filtered, washed with water and the combined filtrate and washings lyophilised. This yielded the sodium salt of 7-phenylacetamido - 3 - hydroxymethyl - ceph - 3 - em - 4 - oic acid as a white amorphous solid (681 mg., 75% yield), which was assayed biologically and by ultraviolet spectrophotometry in aqueous solution.

$E_{1\ cm.}^{1\%}$ (260 m$\mu$)=157.5, 68.5% pure; bioassay, 64.2% pure

Bioautography of this solid using the original ethyl acetate-0.1 M sodium acetate (pH 5.0) system showed only one biologically active zone in the locus of 7-phenylacetamido-3-hydroxymethyl-ceph-3-em-4-oic acid.

(c) Crystallisation of the crude sodium salt of 7-phenylacetamido - 3 - hydroxymethyl - ceph - 3 - em - 4-oic acid: Crude 7 - phenylacetamido - 3-hydroxymethyl-ceph-3-em-4-oic acid sodium salt (prepared as in Example 1b) (839 mg.) was extracted with methanol (25 ml., 10 ml., 4 ml.) and the residue removed by centrifugation. The methanolic solution was then gently evaporated in a slow stream of air to incipient crystallisation, when it was chilled to 5° for one hour. White feathers of needles were obtained, filtered while cold and washed with a little cold ethanol. The yield after drying under vacuum was 300 mg. This product was assayed biologically and by ultra-violet spectrophotometry as before.

$E_{1\ cm.}^{1\%}$ (260 m$\mu$)=199, 87% pure; bioassay, 92% pure

Evaporation of the mother liquors yielded a second crop of crystals (98 mg.) The purity however was much lower (67.5% by U.V., 75.8% by bioassay).

EXAMPLE 2

Action of Rhizobium acetylesterase on 7-(thienyl-2'-acetamido)-cephalosporanic acid: Rhizobium powder prepared as described in Preliminary (5 g.) was suspended in water (200 ml.) and incubated at 30° for 30 min. 7-(thienyl - 2' - acetamido) - cephalosporanic acid ("7-TACA") sodium salt (1.0 g.) was added and the whole rapidly brought to pH 7.0 with 10% (v./v.) phosphoric acid. The mixture was then incubated at 30° and titrated to pH 7.0 with N-sodium hydroxide at regular intervals. 0.1 ml. samples for bioassay were removed at like intervals. The reaction showed the following pattern:

| Time (hr.) | Vol. N.NaOH added (ml.) | Titre of 7-TACA ($\gamma$/ml. at 1/2000 dilution) |
|---|---|---|
| 0 | 0.00 | 1.68 |
| 0.5 | 0.90 | 1.05 |
| 1.0 | 1.60 | 0.81 |
| 2.5 | 2.30 | 0.68 |
| 3.0 | 2.30 | 0.57 |

Theor.=2.22.

The reaction was then terminated by pouring into stirred acetone (400 ml.). After 10 min. the precipitate was filtered off and acetone removed from the filtrate by vacuum evaporation. The residue was diluted to 200 ml. with water and filter through a Seitz filter. The clear brown filtrate was adjusted to pH 3.3 with 10% (v./v.) phosphoric acid and extracted with ethyl acetate (3× 200 ml.). The spent aqueous layer was assayed for bilogical activity after each extraction with the following results.

| Extract No.: | Titre of 7-TACTA ($\gamma$/ml. at 1/100 diln.) |
|---|---|
| 0 | 13.2 |
| 1 | 7.5 |
| 2 | 4.95 |
| 3 | 2.2 |

Thus some 83% of the biological activity was extracted into the solvent.

The ethyl acetate layers were bulked and extracted with water (100 ml., 2× 50 ml.), which had been adjusted to pH 7.5 with saturated bicarbonate solution. The bicarbonate extract was then adjusted to pH 5.5 by stirring with "Amberlite" IRC–50 resin (Rohm & Haas Co.) in the hydrogen cycle. The resin was filtered, washed with water, and the combined filtrate and washings lyophilised to yield the sodium salt of 7-(thienyl-2'-acetamido)-3-hydroxymethyl-ceph-3-em-4-oic acid (592 mg., 66% of theory).

The product was assayed biologically and by ultra-violet spectrophotometry:

$E_{1\,cm.}^{1\%}$ (236 m$\mu$.)=276, 81% pure; bioassay, 65% pure

Bioautographs using the ethyl acetate-0.1 M sodium acetate (pH 5.0) system showed a major biologically active zone in the locus of the hydroxymethyl compound together with a faint trace of the original cephalosporanic acid.

EXAMPLE 3

Action of Rhizobium acetylesterase upon 7-ACA and cephalosporin C: *Rhizobium trifolii* (wild type strain) was grown in a nutrient broth, and portions of the culture fluid were then mixed with an equal volume of a solution either of 7-ACA (10 mg./ml.) or of cephalosporin C (10 mg./ml.) in pH 7.0 phosphate buffer, or of buffer alone. The two substrate solutions were also mixed with an equal volume of uninoculated broth, the latter to act as controls.

All the test solutions were then incubated in a water bath at 33° overnight; 100 portions were spotted on pH 6.0 buffered papers and the chromatograms developed in 70% (v./v.) aqueous n-propanol overnight.

The chromatograms were examined under U.V. light and absorbing zones marked. One paper was then sprayed with M pyridine in acetone followed by 1% (v./v.) phenylacetyl chloride in acetone. This paper and an identical paper unsprayed were then applied to plates seeded with *Bacillus subtilis*. After overnight incubation, the bioactive zones were also noted.

Results (i) 7-ACA: Incubation of 7-ACA with whole cultures of *Rhizobium trifolii* (wild type) results in the production of a substance with $R_f$ 0.62× that of 7-ACA, i.e., in the expected position for the corresponding hydroxy methyl compound. Furthermore this spot showed biological activity versus *B. subtilis* only after the paper has been sprayed with pyridine and phenylacetyl chloride. The paper chromatograms indicated that no 7-ACA was left after the incubation, whereas in the controls, 7-ACA could be detected. These results therefore show that *Rhizobium trifolii* is capable of deacetylating 7-ACA.

(ii) Cephalosporin C: *Rhizobium trifolii* was also shown to deactylate Cephalosporin C by the same technique as described for 7-ACA. However, in this case it was not necessary to spray the paper with pyridine an phenylacetyl chloride in order to show up the biological activity of the product.

The embodiments of the invention in which an exclusive property or privilege is claimed are defined as follows.

We claim:
1. In a process for the preparation of a compound of the formula

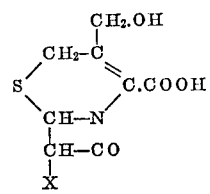

in which X is a member selected from the group consisting of an acylamino and an amino group by enzymatic hydrolysis of a compound of the formula

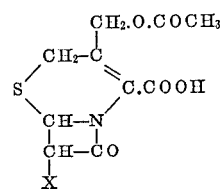

in which X is as defined above, the improvement which comprises using, as esterase, an esterase derived from a species of the genus Rhizobium.

2. A process as claimed in claim 1 in which the Rhizobium species is selected from the group consisting of *Rhizobium trifolii, Rhizobium lupinii, Rhizobium jaconicum, Rhizobium leguminosarum* and *Rhizobium phaesoli*.

3. A process as claimed in claim 1 in which the Rhizobium esterase is derived from a wild culture of a Rhizobium organism.

4. A process as claimed in claim 1 in which *Rhizobium trifolii* isolated as wild-type strains from *Trifolium dubium* is used.

5. A process as claimed in claim 1 in which an enzyme-rich material, prepared from culture of a Rhizobium species, is used.

6. A process as claimed in claim 1 in which the hydrolysis is effected in aqueous medium at a pH between 5 and 8.

7. A process as claimed in claim 1 in which the hydrolysis is effected at a temperature between 20 and 45° C.

8. A process as claimed in claim 1 including the step of introducing the starting compound as the sodium salt thereof.

9. A process as claimed in claim 1 including the step of adding alkali as the hydrolysis proceeds to neutralise the resulting acetic acid.

10. A process as claimed in claim 1 including, after completion of the hydrolysis, the step of removing protein from the hydrolysis medium before recovery of the hydrolysate.

11. A process as claimed in claim 10 in which a water-miscible solvent selected from acetone and methanol is added to the hydrolysis medium to precipitate protein.

12. A process as claimed in claim 1 including the step of buffering the hydrolysis medium and adsorbing a non-solvent-soluble end product on an anion-exchange resin.

13. A process as claimed in claim 1 in which a solvent-soluble end product is extracted from the hydrolysis medium at acid pH by means of a water-immiscible solvent.

14. In a process for the preparation of 3-hydroxymethyl-7-amino-ceph-3-em-4-oic acid having the formula

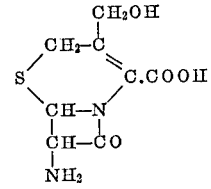

by enzymatic hydrolysis of 7-amino-cephalosporanic acid having the formula

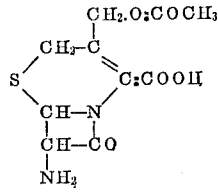

the improvement which comprises using, as esterase, an esterase derived from a species of the genus Rhizobium.

15. A process as claimed in claim 14 in which *Rhizobium trifolii* isolated as wild-type strains from *Trifolium dubium* is used.

16. A process as claimed in claim 14 including the step of introducing the 7-aminocephalosporanic acid as the sodium salt thereof.

17. A process as claimed in claim 14 including the step of adding alkali as the hydrolysis proceeds to neutralise the resulting acetic acid.

18. A process as claimed in claim 14 including the step of isolating 3-hydroxymethyl-7-amino-ceph-3-em-4-oic acid by adjustment of the pH of the hydrolysis liquor to approximately 4.5 to cause said product to precipitate.

References Cited

OTHER REFERENCES

Jeffery et al.: Biochemical Journal (1961), vol. 81, pp. 591–596.

Demain et al.: Nature, Aug. 31, 1963, pp. 909–910.

Chemical Abstracts, vol. 61, September 1964, p. 8868 c.

MAURICE W. GREENSTEIN, *Primary Examiner.*

U.S. Cl. X.R.

195—80; 260—243